US012597403B2

(12) United States Patent
Korogi et al.

(10) Patent No.: US 12,597,403 B2
(45) Date of Patent: Apr. 7, 2026

(54) DISPLAY DEVICE FOR A VEHICLE

(71) Applicant: TOYOTA JIDOSHA KABUSHIKI KAISHA, Aichi-Ken (JP)

(72) Inventors: Yuto Korogi, Nagakute (JP); Yoshimi Kobayashi, Toyota (JP); Katsunori Yamada, Toyota (JP); Yasushi Dohnoue, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 206 days.

(21) Appl. No.: 18/589,428

(22) Filed: Feb. 28, 2024

(65) Prior Publication Data

US 2024/0304164 A1 Sep. 12, 2024

(30) Foreign Application Priority Data

Mar. 6, 2023 (JP) ................................ 2023-033917

(51) Int. Cl.
*G09G 5/14* (2006.01)

(52) U.S. Cl.
CPC ....... *G09G 5/14* (2013.01); *G09G 2340/0471* (2013.01); *G09G 2340/12* (2013.01); *G09G 2380/10* (2013.01)

(58) Field of Classification Search
CPC ........ G09G 5/14; G09G 5/00; G09G 2340/12; G09G 2380/10; G09G 2340/0471; G09G 2340/10; G06V 20/58; G06V 20/56; G06T 2207/30252; G06T 7/20; G06F 18/217; G06F 3/0481
See application file for complete search history.

(56) References Cited

U.S. PATENT DOCUMENTS

| | | | | |
|---|---|---|---|---|
| 2018/0354442 | A1* | 12/2018 | Bergstrom | B60R 1/06 |
| 2019/0143815 | A1* | 5/2019 | Sato | B60K 35/81<br>340/439 |
| 2022/0144086 | A1 | 5/2022 | Sakurai et al. | |
| 2022/0222904 | A1 | 7/2022 | Rober et al. | |

FOREIGN PATENT DOCUMENTS

| | | | |
|---|---|---|---|
| JP | 2006248450 | A | 9/2006 |
| JP | 2008242251 | A | 10/2008 |
| JP | 2017-171117 | A | 9/2017 |
| JP | 2018205429 | A | 12/2018 |
| JP | 2022-076859 | A | 5/2022 |

* cited by examiner

*Primary Examiner* — Xilin Guo
(74) *Attorney, Agent, or Firm* — HAUPTMAN HAM, LLP

(57) ABSTRACT

A display device for a vehicle comprises a display fixed to a vehicle; and a display controller configured to control the display, wherein the display controller is configured to simultaneously display, on the display, a first image indicating an optical flow and a second image indicating a direction of gravity or a horizontal direction perpendicular to the direction of gravity.

10 Claims, 5 Drawing Sheets

DISPLAY DEVICE FOR A VEHICLE

CROSS REFERENCE TO RELATED APPLICATION

This application claims priority to Japanese Patent Application No. 2023-33917 filed on Mar. 6, 2023, which is incorporated herein by reference in its entirety including the specification, claims, drawings, and abstract.

TECHNICAL FIELD

This specification discloses a display device for a vehicle that displays an image on a display provided in a cabin.

BACKGROUND

While the vehicle is running, the occupant may make motion sickness. A sensory confusion hypothesis is known as a cause of such a motion sickness. The sensory confusion hypothesis is an hypothesis that a motion sickness occurs due to contradiction of information detected by a plurality of sensory devices such as a vestibule and a visual sense.

Here, Patent Document 1 discloses a technology for displaying an indicator indicating a direction of an optical flow of a driver on a display in a vehicle. The optical flow is a vector indicating a flow direction of the landscape.

According to the technology described in Patent Document 1, the occupant can visually grasp the moving direction of the vehicle. Thus, the contradiction between the visually detected information and the information detected in the vestibule is reduced, so that the motion sickness of the occupant is reduced to some extent.

However, in the prior art such as Patent Document 1, only an image indicating an optical flow is displayed. Therefore, the conventional technology cannot visually grasp the horizontal direction or the gravity direction. As a result, in the prior art, the motion sickness cannot be sufficiently reduced.

Accordingly, this specification discloses a display device for a vehicle in which motion sickness of an occupant is further reduced.

CITATION LIST

PATENT DOCUMENT 1: JP. 2017-171117. A

SUMMARY

A display device for a vehicle disclosed in this specification, comprises a display fixed to a vehicle; and a display controller configured to control the display, wherein the display controller is configured to simultaneously display, on the display, a first image indicating an optical flow and a second image indicating a direction of gravity or a horizontal direction perpendicular to the direction of gravity.

With this configuration, the occupant can visually grasp the moving direction and the direction of gravity of the vehicle. As a result, the motion sickness of the occupant is effectively reduced.

The display may include a main display area in which a content image is displayed, and a support display area arranged so as to surround the main display area, and the display controller may be configured to execute a process of displaying the first image and the second image in the support display area in parallel with a process of displaying the content image in the main display area.

With this configuration, the occupant can visually grasp the moving direction and the direction of gravity of the vehicle while watching the content image. As a result, the occupant can comfortably utilize the content image without motion sickness.

The second image may be a linear figure parallel to the horizontal direction and passing through a predetermined reference point, and the display controller may be configured to change a display position of the first image such that a height position of the reference point changes in conjunction with a change in acceleration of the vehicle.

Thus, the occupant can clearly grasp the change in acceleration and the horizontal direction. As a result, the motion sickness of the occupant is effectively prevented.

The first image may include a plurality of arrows radially spreading from a predetermined focus point or converging at the focus point, the reference point may be the same point as the focus point, the display controller may be configured to cause the display to superimpose and display the linear figure with the plurality of arrows, and the display controller may be configured to change a display position of the focus point in the display according to a moving direction and an acceleration of the vehicle, and to change a direction of the arrow according to a moving speed of the vehicle.

With this configuration, the occupant can clearly understand the moving direction of the vehicle. As a result, the motion sickness of the occupant is effectively prevented.

The display controller may be configured to: compare a rate of change of the first image and the second image with a predetermined allowance value; and display the first image and the second image on the display in such a manner that the change of the first image and the second image is less notable when the rate of change exceeds the allowance value, as compared with a case where the rate of change does not exceed the allowance value.

With this configuration, sickness caused by the first image and the second image can be effectively prevented.

According to the technology disclosed in this specification, the motion sickness of the occupant is effectively reduced.

BRIEF DESCRIPTION OF DRAWINGS

Embodiment(s) of the present disclosure will be described based on the following figures, wherein.

DESCRIPTION OF EMBODIMENT

Figure 1:
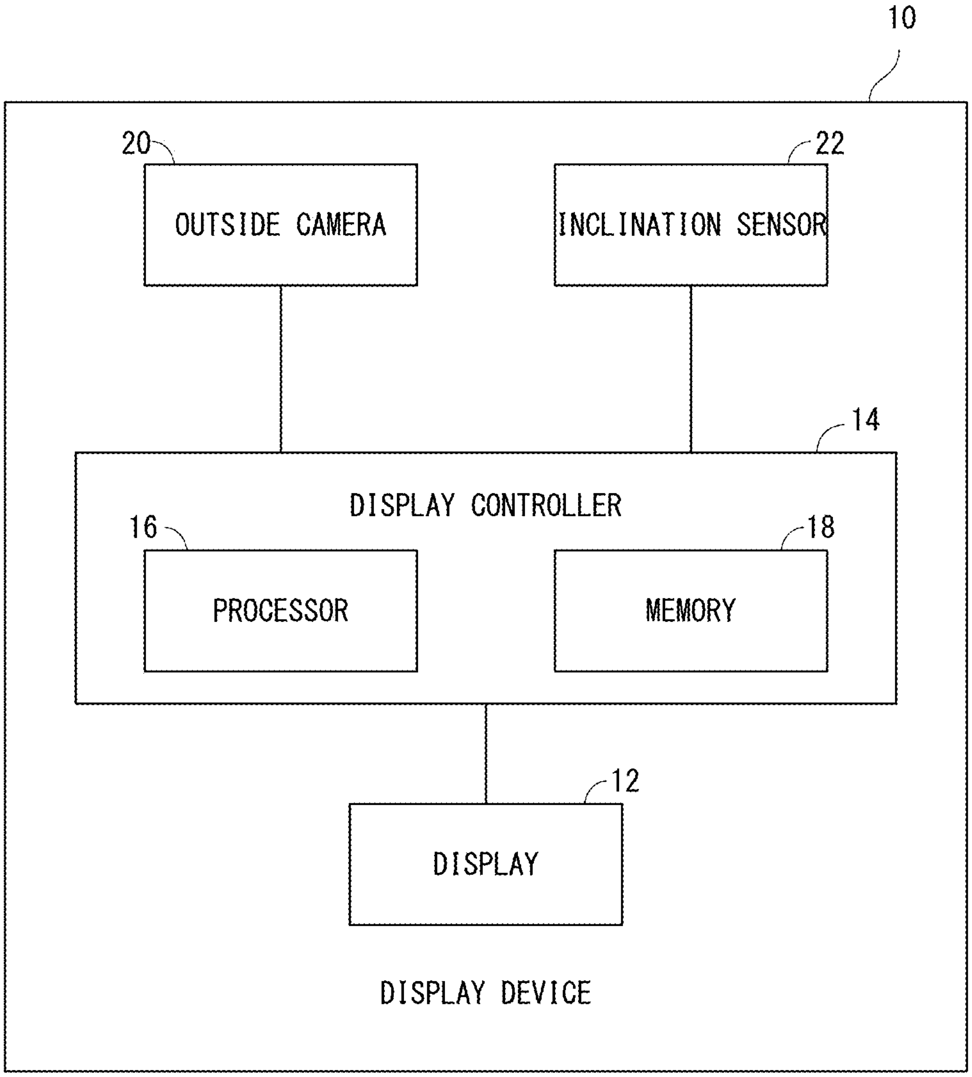
FIG. 1 is a block diagram showing a configuration of a display device for a vehicle.

Hereinafter, a configuration of a display device 10 for a vehicle will be described with reference to the drawings. FIG. 1 is a block diagram showing a configuration of a display device 10. The display device 10 includes a display 12, an outside camera 20, an inclination sensor 22, and a display controller 14.

The display 12 is temporarily or permanently disposed within the vehicle and displays an image. The display 12 includes, for example, a liquid crystal display, an organic EL display, a projector, or a combination thereof. The display 12 may be a display attached to a vehicle as an electrical component. For example, the display 12 may be a multimedia display mounted in the cabin to display map and audio information. Further, the display 12 may be a portable display (e.g., a display incorporated in a smartphone) that can be used both in and out of the vehicle. In this case, a holder for detachably holding the display 12 is provided in the vehicle. The display 12 is temporarily fixed to the vehicle by the holder.

Figure 2:
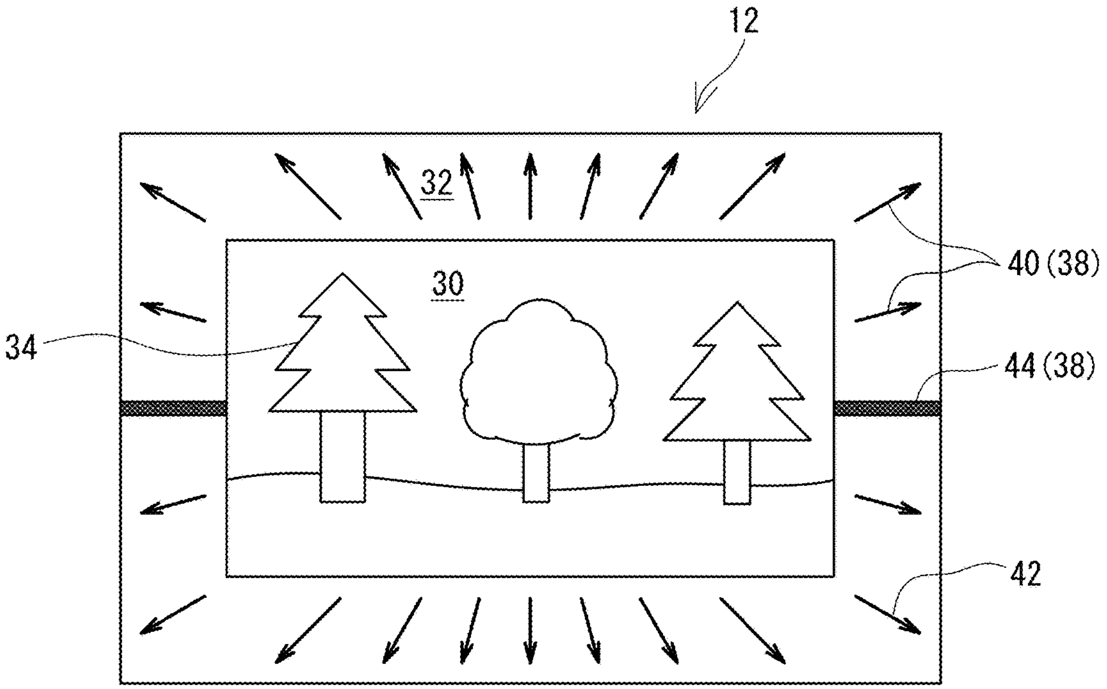
FIG. 2 is a diagram showing an example of a layout of a display area of a display.
Figure 2:
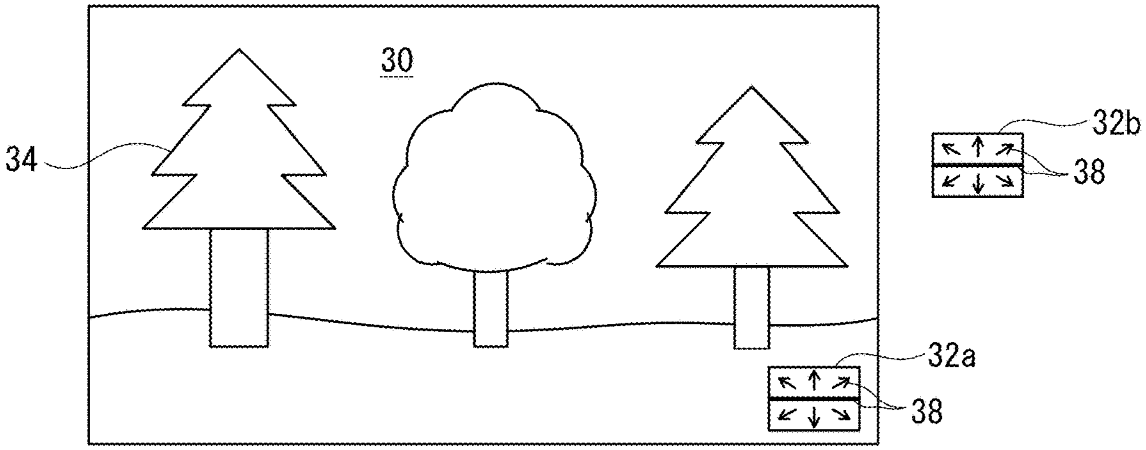

FIG. 2 is a diagram showing an example of a layout of a display area of the display 12. As shown in FIG. 2, the display 12 includes a support display area 32 for displaying a support image 38. The support image 38 is an image for suppressing motion sickness of the occupant. The support image 38 includes a first image 40 indicating an optical flow and a second image 44 indicating a gravity direction (not shown in FIG. 2) or a horizontal direction. The details of the support image 38 will be described later. Further as shown in FIG. 2, the first image 40 includes a plurality of arrows 42.

The display 12 may further include a main display area 30 for displaying the content image 34. The content image 34 is not particularly limited as long as it is an image other than the support image 38. Accordingly, the content image 34 may be, for example, a moving image for entertainment, an operation screen for operating electrical components, or a map image.

As shown in the upper part of FIG. 2, the display 12 may have a main display area 30 and a support display area 32. In this case, the support display area 32 may have a shape surrounding the main display area 30. As shown in the lower part of FIG. 2, the support display area **32*a* may be disposed inside the main display area 30. Further, the support display area 32*b* may be separated from the main display area 30. Further, the display 12 may have the support display area 32, but may not have the main display area 30**.

The outside camera 20 is attached to a front portion of the vehicle, and images a landscape in front of the vehicle. The captured image is transmitted to the display controller 14 as a landscape image. The number of the outside cameras 20 is not limited to one, and a plurality of outside cameras 20 may be provided.

The inclination sensor 22 detects inclination of the vehicle with respect to the direction of gravity. The inclination sensor 22 is, for example, an inertial measuring device in which an acceleration sensor and a gyroscope are combined. The inclination detected by the inclination sensor 22 is transmitted to the display controller 14 as inclination information.

The display controller 14 controls driving of the display 12. The display controller 14 is physically a computer having a processor 16 and a memory 18. In FIG. 1, the display controller 14 is illustrated as a single computer. However, the display controller 14 may be configured by combining two or more physically separate computers. Further, a part or all of the display controller 14 may be disposed outside the vehicle. In this case, some or all of the display controller 14 has a communication interface for communicating with at least one of the display 12 and the computer in the vehicle. The display controller 14 generates a support image 38 to be displayed on the display 12 based on the landscape image transmitted from the outside camera 20 and the inclination information transmitted from the inclination sensor 22. Further, the display controller 14 displays the generated support image 38 on the display 12.

Figure 3:
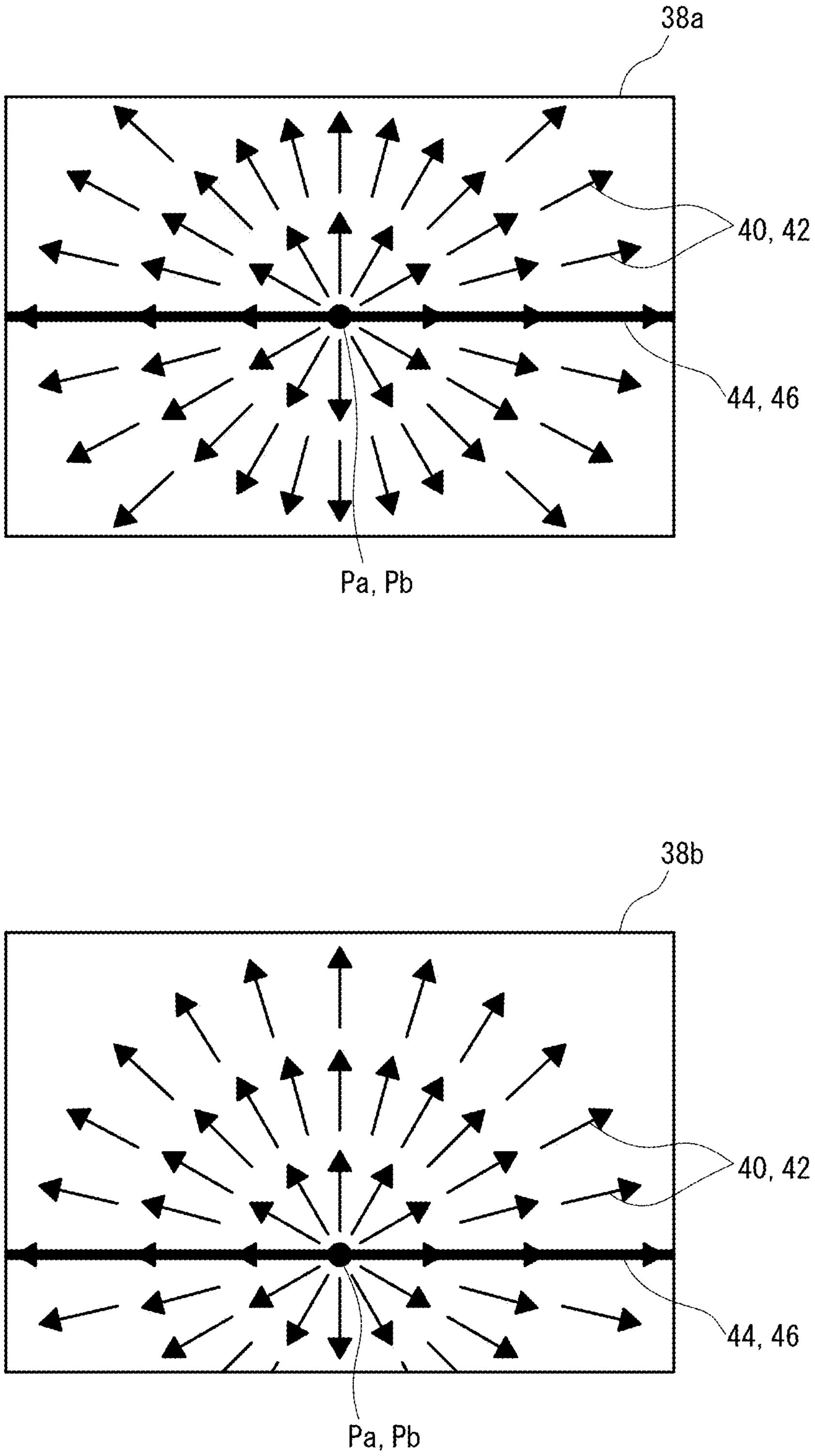
FIG. 3 is a diagram showing an example of a support image.
Figure 4:
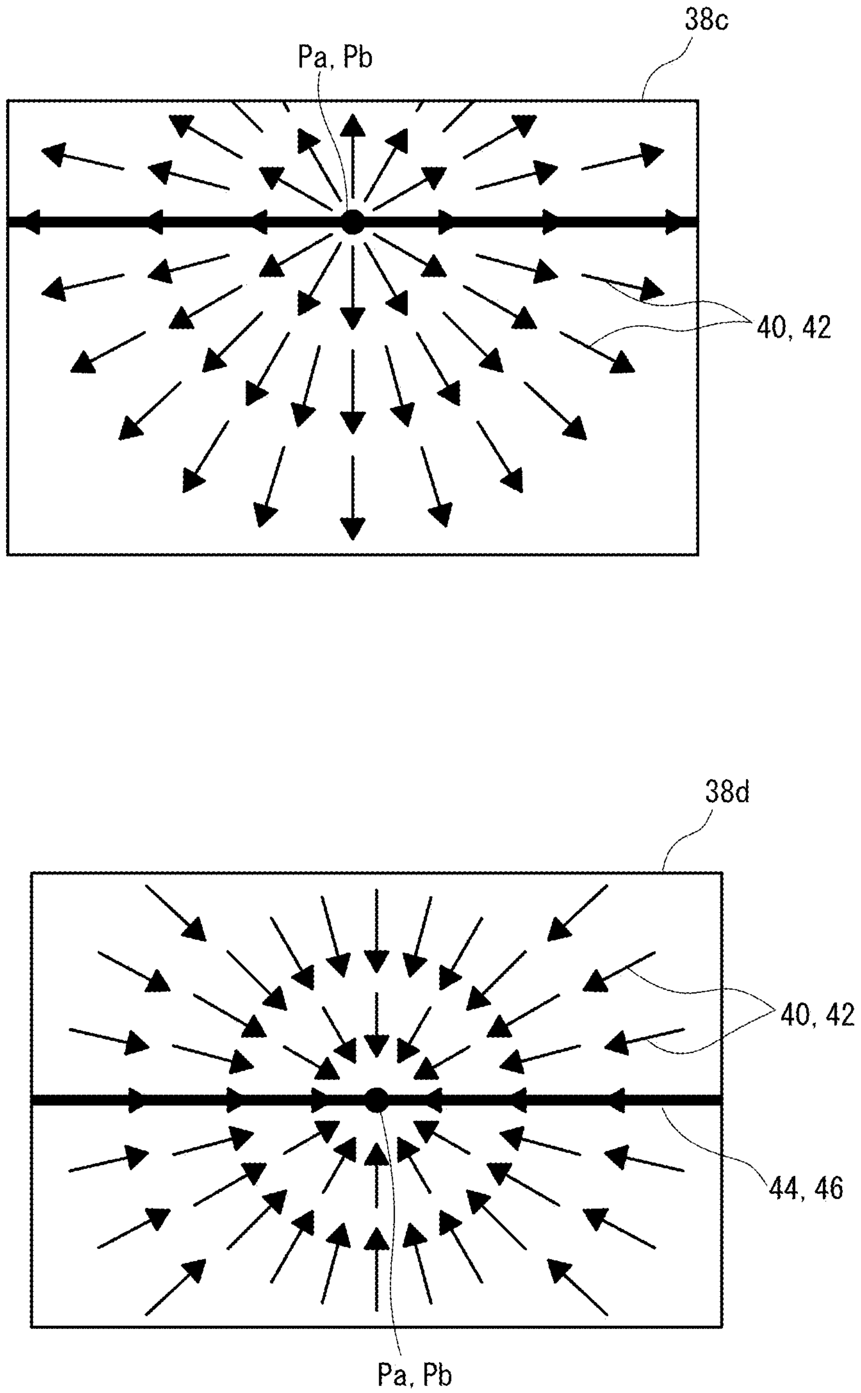
FIG. 4 is a diagram showing another example of the support image.
Figure 5:
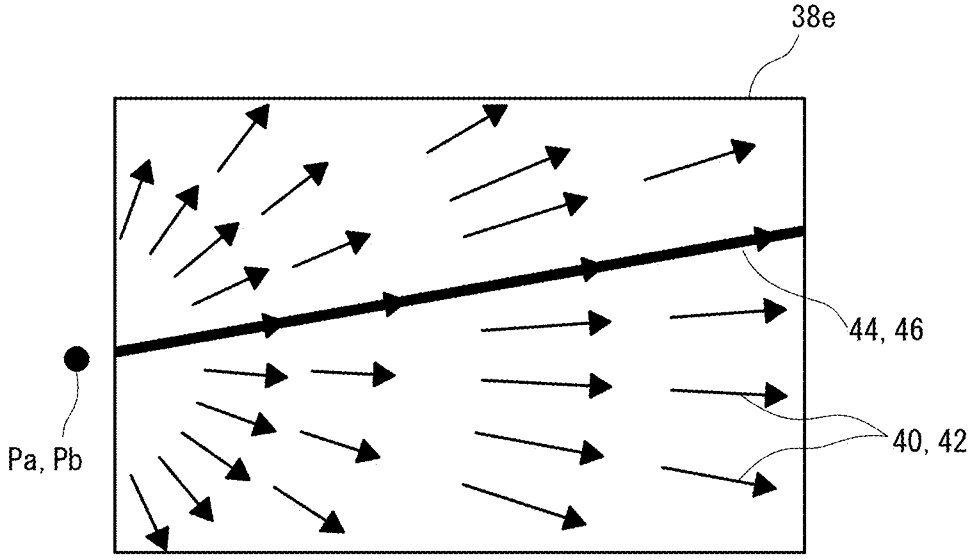
FIG. 5 is a diagram showing another example of the support image.

The support image 38 will now be described with reference to FIGS. 3 to 5. FIGS. 3 to 5 show an example of the support image 38. FIGS. 3 to 5 show a case where the support display area 32 is completely independent of the main display area 30. However, as described above, the main display area 30 may be disposed inside the support display area 32.

The support image 38 includes a first image 40 and a second image 44. The first image 40 is an image showing an optical flow which is a direction in which a landscape flows. This will be described in more detail. In the case of this example, the landscape in front of the vehicle is captured by the outside camera 20 attached to the front portion of the vehicle. Thereby, a landscape image outside the vehicle is obtained every predetermined sampling period. The display controller 14 extracts a plurality of feature points from each of the landscape images. To extract this feature point, the display controller 14 utilizes techniques such as gradient direction histograms, speed-up robust characteristics, local binary patterns, Haar wavelets, and color histograms. Subsequently, the display controller 14 compares a plurality of landscape images to identify the direction in which the feature points move with the elapse of time. The movement direction specified in this manner is an optical flow.

The display controller 14 displays the first image 40 indicating the optical flow in the support display area 32. The first image 40 is not particularly limited as long as it shows an optical flow. As shown in FIGS. 3 to 5, in this example, the first image 40 includes a plurality of arrows 42 that spread from a predetermined focus point Pa or a plurality of arrows 42 that converge toward the focus point Pa.

The upper part of FIG. 3 shows the support image **38*a* when the vehicle moves straight at a constant speed. In this case, the first image 40 includes a plurality of arrows 42 that are radially spread from the focus point Pa. At this time, the focus point Pa is positioned at the center of the camera angle of view, and consequently, at the center of the support display area 32**.

The lower part of FIG. 3 shows the support image **38*b* when the vehicle moves forward while accelerating. Again, the first image 40 includes a plurality of arrows 42 that are radially spread from the focus point Pa. At this time, however, the focus point Pa moves downward compared to the support image 38*a*. This is because when the vehicle accelerates, the rear portion of the vehicle sinks slightly relative to the front portion. When the vehicle is in the inclined posture in which the front is raised, the landscape outside the vehicle moves relatively downward with respect to the angle of view of the outside camera 20**. Therefore, when the vehicle accelerates, the focus point Pa also moves downward as compared with the case where the vehicle does not accelerate.

The upper part of FIG. 4 shows the support image **38*c* when the vehicle moves forward while decelerating. Again, the first image 40 includes a plurality of arrows 42 that are radially spread from the focus point Pa. At this time, the focus point Pa moves upward compared to the case of the support image 38*a*. This is because when the vehicle slows down, the front portion of the vehicle sinks slightly more than the rear portion. When the front of the vehicle is in the inclined posture in which the front of the vehicle is lowered, the landscape outside the vehicle moves relatively upward with respect to the angle of view of the outside camera 20. Therefore, when the vehicle slows down, the focus point Pa also moves downward as compared with the case where the vehicle does not accelerate. The lower part of FIG. 4 shows the support image 38*d* when the vehicle retracts at a constant speed. In this case, the first image 40 includes a plurality of arrows 42** that converge radially toward the focus point Pa.

FIG. 5 shows a support image 38*e* when the vehicle turns to the left. In this case, the first image 40 includes a plurality of arrows 42 moving from the left to the right. At this time, the focus point Pa is located outside the support display area 32.

Next, the second image 44 will be described. The second image 44 is an image showing a direction of gravity (not shown in FIGS. 3 to 5) or a horizontal direction perpendicular to the direction of gravity. As shown in FIGS. 3 to 5, in this example, the second image 44 includes a linear FIG. 46 indicating the horizontal direction. The display controller 14 specifies the horizontal direction based on the detection result of the inclination sensor 22. Then, the display controller 14 causes the support display area 32 to display a linear FIG. 46 parallel to the horizontal direction. Here, when the vehicle is not inclined to the left or right, the linear FIG. 46 is parallel to the upper edge or the lower edge of the display 12, as shown in the support image 38*a*, 38*b*, 38*c* and 38*d*.

At this time, the linear FIG. 46 passes through a predetermined reference point Pb. The reference point Pb is a point that moves up and down by the acceleration of the vehicle. In this example, the reference point Pb is the same as the focus point Pa. Accordingly, when the vehicle is accelerating (i.e., in the case of the support image 38*b*), the linear FIG. 46 moves downward as compared with the case of the constant speed traveling (i.e., in the case of the support image 38*a*). Further, when the vehicle is slowing down (i.e., in the case of the support image 38*c*), the linear FIG. 46 moves upward as compared with the case of the constant speed traveling (i.e., in the case of the support image 38*a*).

When the vehicle is inclined to the left and right, the linear FIG. 46 is inclined with respect to the display 12. For example, when the vehicle turns to the left, the left side of the vehicle is slightly lower than the right side. In this case, as shown in FIG. 5, the linear FIG. 46 indicating the horizontal direction tilts upward to the right with respect to the upper edge or the lower edge side of the display 12. When the vehicle turns to the right, the linear FIG. 46 tilts upward to the left with respect to the upper edge or the lower edge of the display 12.

The display controller 14 superimposes the first image 40 and the second image 44 on the same support display area 32. Thus, the occupant can visually grasp the moving direction, acceleration, and inclination of the vehicle. As a result, the motion sickness of the occupant can be effectively reduced.

That is, it is said that the motion sickness occurs when the visually detected information conflicts with the information detected in the vestibule. For example, when the vehicle tilts to the right side, the occupant and the interior components of the vehicle tilt to the right side as well. As a result, the occupant seems that the interior part is not inclined with respect to the occupant. That is, in this case, the occupant cannot visually detect the inclination of the vehicle. On the other hand, the vestibule detects the inclination of the body with respect to the direction of gravity. Thus, when the visually detected information does not match the information detected in the vestibule, the motion sickness tends to occur. In particular, when the occupant is watching the content image 34 displayed in the main display area 30 of the display 12, the occupant hardly sees a scene outside the vehicle. Therefore, when the occupant is watching the content image 34, it is hardly possible to visually detect the inclination of the vehicle. As a result, the degree of inconsistency between the vision and the vestibule increases, and thus the motion sickness of the occupant tends to occur.

In this example, as described above, the display controller 14 displays the first image 40 indicating the optical flow and the second image 44 indicating the horizontal direction in the support display area 32. With this configuration, the occupant can visually detect the moving direction and the horizontal direction of the vehicle without looking at a scene outside the vehicle. As a result, the vision detection information is prevented from contradicting with the vestibular detection information. Thus, the motion sickness of the occupant can be effectively prevented. In this example, the focus point Pa of the first image 40 and the reference point Pb of the second image 44 are moved up and down according to the acceleration. Thus, since the occupant can visually detect the acceleration, the motion sickness can be more effectively prevented.

As shown in the upper part of FIG. 2, when the support display area 32 is provided around the main display area 30, the occupant can view the support image 38 while watching the content image 34 displayed in the main display area 30. This makes it possible to achieve both prevention of motion sickness of the occupant and utilization of the content image 34 by the occupant.

By the way, the support image 38 continuously changes according to the movement of the vehicle. For example, when the vehicle runs on an offload having a large convexity, the linear FIG. 46, which is the second image 44, moves up and down at small intervals and swings in a seesaw shape. However, when the change of the support image 38 is severe, the motion sickness of the occupant tends to occur. Accordingly, when the rate of change of the support image 38 is equal to or greater than a predetermined allowance value, the display controller 14 displays the support image 38 in a form in which the change of the support image 38 is less notable than when the rate of change of the support image 38 is less than the allowance value.

For example, when the amount of change per unit time of the support image 38 is equal to or greater than a predetermined allowance value, the display controller 14 makes the change of the support image 38 less notable than when the amount of change is less than a reference value. In order not to make the change in the support image 38 notable, for example, the display controller 14 reduces the color of the first image 40 and the second image 44. Alternatively, the display controller 14 may lower the frame rate for displaying the support image 38. With this configuration, the sickness of the occupant caused by the support image 38 is effectively suppressed.

Any of the configurations described above is an example. The other configurations of the display device 10 may be modified as long as the display device 10 has the configuration described in claim 1. For example, in the above description, the display controller 14 superimposes and displays the second image 44 on the first image 40. However, if the first image 40 and the second image 44 are displayed simultaneously, they may be displayed separately from each other (i.e., not overlapping each other). The shapes of the first image 40 and the second image 44 may also be appropriately changed. For example, the first image 40 may be composed of only one arrow 42. Further, instead of or in addition to the linear FIG. 46 parallel to the horizontal direction, the second image 44 may have a figure parallel to the direction of gravity.

In the above description, the display controller 14 determines the optical flow and the direction of gravity based on the information detected by the outside camera 20 and the inclination sensor 22. However, the display controller 14 may determine the optical flow and the direction of gravity based on other information. For example, the display controller 14 may calculate the optical flow based on information used for traveling control of the vehicle, for example, vehicle speed, acceleration, steering angle, and the like. Further, an in-vehicle camera for imaging an occupant may be disposed in the vehicle. The display controller 14 may identify the viewpoint of the occupant based on the image captured by the in-vehicle camera and correct the optical flow according to the identified viewpoint.

REFERENCE SIGNS LIST

10 display device, 12 display, 14 display controller, 16 processor, 18 memory, 20 outside camera, 22 inclination sensor, 30 main display area, 32 support display area, 34 content image, 38 support image, 40 first image, 42 arrows, 44 second image, 46 linear figure, Pa focus point, Pb reference point.

The invention claimed is:

1. A display device for a vehicle, the display device comprising:
- a display configured to be fixed to the vehicle; and
- a display controller configured to
  - generate an image based on (i) a landscape image transmitted from a camera of the vehicle or travel information of the vehicle and (ii) inclination information transmitted from a sensor of the vehicle, the image including a first image indicating an optical flow and a second image indicating a direction of gravity or a horizontal direction perpendicular to the direction of gravity, and
  - control the display to simultaneously display the first image and the second image in a manner that the first image is superimposed on the second image,
- wherein the display controller is configured to
  - calculate the optical flow based on the travel information of the vehicle including at least one of a moving speed, an acceleration, or a steering angle, and
  - change a display position of the first image based on the calculated optical flow.

2. The display device for the vehicle according to claim 1, wherein
- the display includes a main display area in which a content image is displayed, and a support display area arranged so as to surround the main display area, and
- the display controller is configured to execute a process of displaying the first image and the second image in the support display area in parallel with a process of displaying the content image in the main display area.

3. The display device for the vehicle according to claim 1, wherein
- the second image is a linear figure parallel to the horizontal direction and passing through a predetermined reference point, and
- the display controller is configured to change the display position of the first image to cause a height position of the predetermined reference point changes in conjunction with a change in the acceleration of the vehicle.

4. The display device for the vehicle according to claim 3, wherein
- the first image includes a plurality of arrows radially spreading from a predetermined focus point or converging at the focus point,
- the predetermined reference point is a same point as the focus point,
- the display controller is configured to cause the display to superimpose and display the linear figure with the plurality of arrows, and
- the display controller is configured to change a display position of the focus point in the display according to a moving direction and the acceleration of the vehicle, and to change a direction of the plurality of arrows according to the moving speed of the vehicle.

5. The display device for the vehicle according to claim 1, wherein
- the display controller is configured to:
  - compare a rate of change of the first image and the second image with a predetermined allowance value; and
  - display the first image and the second image on the display in such a manner that the change of the first image and the second image is less notable when the rate of change exceeds the allowance value, as compared with a case where the rate of change does not exceed the allowance value.

6. The display device for the vehicle according to claim 1, wherein the display controller is configured to continuously change the first image and the second image according to the travel information of the vehicle.

7. The display device for the vehicle according to claim 6, wherein
- the display includes a main display area in which a content image is displayed, and a support display area arranged so as to surround the main display area, and
- the display controller is configured to execute a process of displaying the first image and the second image in the support display area in parallel with a process of displaying the content image in the main display area.

8. The display device for the vehicle according to claim 7, wherein
- the second image is a linear figure parallel to the horizontal direction and passing through a predetermined reference point, and
- the display controller is configured to change the display position of the first image to cause a height position of the predetermined reference point changes in conjunction with a change in the acceleration of the vehicle.

9. The display device for the vehicle according to claim 8, wherein
- the first image includes a plurality of arrows radially spreading from a predetermined focus point or converging at the focus point,
- the predetermined reference point is a same point as the focus point,
- the display controller is configured to cause the display to superimpose and display the linear figure with the plurality of arrows, and
- the display controller is configured to change a display position of the focus point in the display according to a moving direction and the acceleration of the vehicle, and to change a direction of the plurality of arrows according to the moving speed of the vehicle.

10. The display device for the vehicle according to claim 9, wherein
- the display controller is configured to:
  - compare a rate of change of the first image and the second image with a predetermined allowance value; and
  - display the first image and the second image on the display in such a manner that the change of the first image and the second image is less notable when the rate of change exceeds the allowance value, as compared with a case where the rate of change does not exceed the allowance value.

* * * * *